July 10, 1956  H. BRUDNEY  2,753,660
DOLLS' EYES
Filed Nov. 2, 1953
FIG. 1
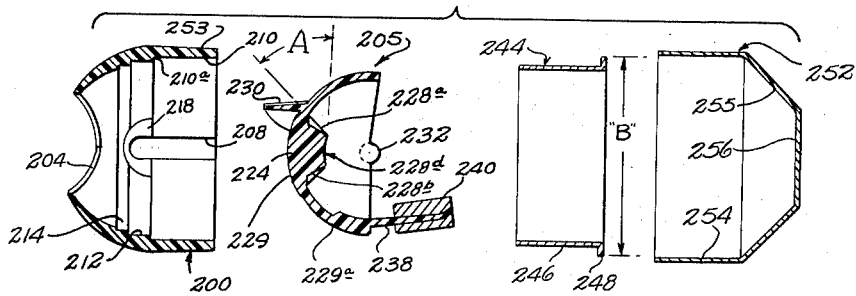
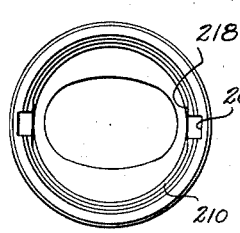
FIG. 2
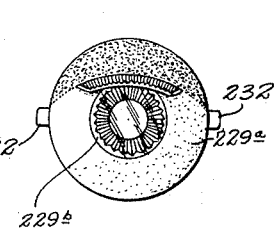
FIG. 3
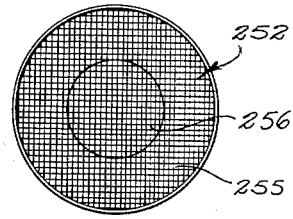
FIG. 4
FIG. 6
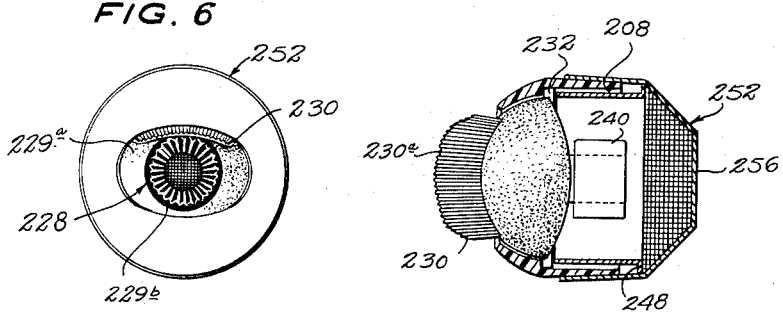
FIG 7  FIG. 5
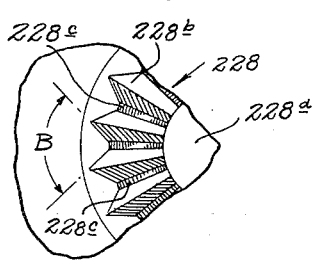
INVENTOR.
HARRY BRUDNEY,
BY
Albert M Zalkind
ATTORNEY.

United States Patent Office 2,753,660
Patented July 10, 1956

2,753,660

DOLLS' EYES

Harry Brudney, New York, N. Y., assignor to Dollac Corporation, New York, N. Y., a corporation of New York Application November 2, 1953, Serial No. 389,700

5 Claims. (Cl. 46—169)

This invention relates to dolls' eyes and more particularly to movable eyes intended for individual mounting in the eye sockets of a sleeping doll's head, being a continuation-in-part of my patent application S. N. 342,162 filed March 13, 1953, for Doll's Eye and Mount Therefor.

It is an object of my invention to provide an economical construction for a doll's eye which will be entirely enclosed as to mechanism and which can be easily mounted within a doll's head.

It is another object of the invention to provide a doll's eye having a realistic and lifelike appearance.

My invention utilizes a non-resilient retaining ring which slides into the socket to engage the eye ball trunnions. A casing is forced over the rear cylindrical portion of the socket to clamp the material of the socket on to the ring.

In the construction of the eye itself I provide a novel feature in the use of a substantially transparent eye ball having a clear rearwardly concave pupil surrounded by a plurality of plane surfaces molded in a frusto-conical formation, the angle of cone being substantially 45°. A rear casing is provided interiorly with a glossy black surface spaced from the pupil and iris areas. This effects a brilliant black pupil and a bright iris.

A detailed description of my invention will now be given in conjunction with the appended drawing, in which:

Fig. 1 is an exploded view of a construction;

Fig. 2 shows a rear view of the socket of Fig. 1;

Fig. 3 shows a front view of the eyeball of Fig. 2 as it would appear when unenclosed;

Fig. 4 shows the black interior of the casing shown in Fig. 1;

Fig. 5 is a horizontal section of the assembled eye;

Fig. 6 is a front view of the assembled eye; and

Fig. 7 is a magnified view of a portion of the iris.

Referring to the drawing an eye structure is disclosed wherein an optical effect is produced to blacken the pupil of the eyeball while at the same time to provide reflection from the iris area so as to effect a realistic and lifelike appearance.

The eye assembly comprises a molded socket 200 having an opening 204 for the eyeball 205. The socket is open at the rear end and is formed with a pair of laterally disclosed grooves 208. The rear portion of the shell is recessed at 210 providing a shoulder 210a and the forward portion has thickened ridges such as 212 and 214. The grooves 208 terminate forwardly in reinforcing flattened areas 218 and open outtwardly of the rim of the shell as shown in the rear view of Fig. 2.

The eyeball itself is preferably molded of a transparent plastic, and I prefer to provide a slight blue tint thereto. The pupil area 224 is relatively smooth while the iris 228, surrounding the pupil, comprises a plurality of plane surfaces such as 228a and b. These surfaces are molded at the rear in a frusto-conical formation, angle A being about 45°. The surfaces are related at an angle B of 80° to 110°, (Fig. 6) extending in radial directions outwardly of the pupil and face the interior of the eyeball chamber, there being flat spacing surfaces 228c between adjacent surfaces 228a and b. Thus, light entering the iris area strikes the surfaces 228a and b, primarily, and is subsantially prevented, or at least prevented to a high degree from passing into the eyeball interior, being reflected outwardly again from the surfaces. I have found that the providing of a concave curvature in the central exposed area 228d of the molded iris formation, this being the pupil region, serves to effect a sharp delineation of the pupil. The degree of curvature is not critical and may be greater than the eyeball radius as shown. The outer surface 229 of the eyeball is raised a few thousandths of an inch in the range .001" to .01" where it is concentric with the iris, this portion being transparent, and the remaining surface 229a is coated with any suitable opaque white substance up to the circular area 229b which surrounds the iris. Thus, any light entering into the interior of the eyeball can come only through the pupil and iris and area 229b.

An eyelash 230 is molded directly of the material of the eyeball, having a ridged formation and terminating in a corrugated edge 230a. A pair of trunnions 232 are molded to the sides of the eyeball in position to engage within respective grooves 208 during assembly.

Finally, a weight support lever 238 is molded integrally with the eyeball and a metallic weight 240 is clinched onto the end of the lever as shown in Fig. 1.

Thus, it will be apparent that the eyeball may be slid into the eye socket 200 and pivotally supported on its trunnions 232 which are carried in the respective grooves 208 and engage the front end of the grooves at the flat areas 218.

In order to retain the eyeball in place a ring of metal or plastic may be utilized having a cylindrical portion 246 which is accommodated within the recess 210 as far as shoulder 210a. Ring 244 has a flange portion 248 which is spaced from the rim of the socket 200 as shown in Fig. 13. The ring portion 246 reinforces the eye socket as well as forming means for securely retaining the eyeball in proper pivotal position.

If desired the ring 244 may have a force fit within recess 210. However, I prefer to make it smoothly slidable therein and rely on the casing element 252 having a substantially cylindrical portion 254 which may be given a slight taper, if desired, to grip the outer marginal peripheral edge 253 of the eye socket and deform it inwardly radially so as to securely bind the socket onto the cylindrical portion 246. It will, of course, be apparent that flange 248 should be of a diameter slightly less than the inside diameter of casing portion 254 and it will likewise be apparent that one or more narrow slits may be provided in the material of the recessed portion 210 to promote resiliency so that such recessed portion may be more easily pressed against the cylindrical portion 246 of the ring. The flange 248 is engaged by the sloping surface 255 of the casing, which casing is closed by an end surface 256. Thus, the flange serves as a stop or motion limiting means for the casing.

The inner surfaces 254, 255, 256 are coated with any suitable glossy black substance, this being an important feature of my invention. I have found that this effects a very brilliant dark pupil of surprisingly lifelike quality and depth. If the coating on the interior of the casing is a dull black, the realistic effect is not present to nearly the same degree.

If Figs. 3 and 6 are compared, the striking effect produced by the combination of elements heretofore described will be more clearly understood. Fig. 3 represents the eyeball as it would normally appear by itself and held over any suitably light surface, such as a sheet of white paper. In this instance, the iris is just slightly darkened in appearance while the pupil is entirely clear except, of course, for the coloring produced by such tint as is provided in the particular material from which the eye is molded. The exterior portion of the eye surrounding the iris as represented by the area 229a is coated in opaque white, as heretofore stated, except for the narrow area 229b.

When, however, the eye is assembled, a considerable transformation takes place as shown in Fig. 6. Here the pupil is a very lifelike shiny black while the iris has actually taken on a lighter hue and the area 229b becomes realistically dark. This is a very surprising fact when it is considered that the iris as shown in Fig. 3 has a light reflecting surface behind it, while as shown in Fig. 6 it has a black reflecting surface. It is pointed out that the contrast between the lightness of the iris and the darkness of the pupil is considerably more than would normally be expected by the effect on these two areas due to providing the black coating in the interior of the casing. The effect is actually over and above that which would normally be expected by virtue of the contrast produced by mere darkening of the pupil. There appears to be an increased reflectivity provided by the small plane surfaces which make up the iris and may likely be due to what may be termed a "mirror effect" which augments the reflective power of the plane surfaces by virtue of being disposed in a dark chamber. The brilliant dark pupil and the lifelike depth thereof I attribute to an optical illusion in that the observer is, I believe, seeing the shiny surface coating of the casing interior through the pupil, which surface coating being spaced from the pupil gives an effect of depth as well as brilliance.

Whatever the cause of the surprisingly high degree of light contrast effected by the particular combination of the pupil, iris planes, and glossy black surfaces of the casing as disclosed above, it is superior in lifelike quality to dolls' eyes known heretofore in the prior art and the construction has the further advantage of faster production. Thus, whereas dolls' eyes are now laboriously hand painted over individual areas such as the pupil and the iris, to achieve a lifelike effect, I find that I can produce a better effect by permitting the pupil and the iris to remain substantially transparent and by merely coating the casing interiorally with black lacquer or enamel or any other glossy black substance.

Additional changes will occur to persons skilled in the art and accordingly I do not seek to be limited to the specific embodiment illustrated herein except as set forth in the appended claims.

I claim:

1. A doll's eye comprising an eye socket, an eyeball pivotally mounted within said socket, and having a pupil and iris area substantially exposed through an eye opening in a forward portion of said socket, said pupil being substantially transparent, said iris comprising a multiplicity of plane surfaces radiating from said pupil and molded of the material of said pupil, and casing means enclosing said eyeball at the rear and being secured to said socket, said eyeball being open at the rear facing the interior of said casing means, the interior surface of said casing means being black in color and being spaced from said iris and pupil area, said casing means being secured to said socket so as to make an eye unit for insertion in a doll head.

2. A doll's eye as set forth in claim 1 wherein the inner surface of said pupil area facing said black surface of said casing means is concave.

3. A doll's eye as set forth in claim 1, wherein said interior surface of said casing means is shiny black in color.

4. A doll's eye as set forth in claim 1 wherein said casing means is provided with flange means to grip said socket.

5. A doll's eye as set forth in claim 1, including a reinforcing ring within said socket giving radial support thereto, said casing means having a peripheral flange for gripping said socket externally of the area reinforced by said ring.

References Cited in the file of this patent

UNITED STATES PATENTS

| | | |
|---|---|---|
| 1,963,129 | Grubman | June 19, 1934 |
| 2,051,876 | Marcus | Aug. 25, 1936 |
| 2,133,635 | Schaeffer | Oct. 18, 1938 |
| 2,143,029 | Popovich | Jan. 10, 1939 |
| 2,219,855 | Wagler | Oct. 29, 1940 |
| 2,627,701 | Rose | Feb. 10, 1953 |
| 2,657,500 | Samolewitz | Nov. 3, 1953 |
| 2,663,972 | Lee | Dec. 29, 1953 |
| 2,667,013 | Tommarchi et al. | Jan. 26, 1954 |
| 2,696,064 | Wolfe et al. | Dec. 7, 1954 |